(12) United States Patent
Brown

(10) Patent No.: US 7,809,858 B1
(45) Date of Patent: Oct. 5, 2010

(54) CROSS-PROTOCOL URL MAPPING

(75) Inventor: Darrick P. Brown, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1148 days.

(21) Appl. No.: 10/689,860

(22) Filed: Oct. 21, 2003

(51) Int. Cl.
G06F 15/16 (2006.01)

(52) U.S. Cl. ...................................... 709/245
(58) Field of Classification Search ................. 709/245, 709/246
See application file for complete search history.

(56) References Cited

U.S. PATENT DOCUMENTS

| | | | |
|---|---|---|---|
| 5,572,643 A | 11/1996 | Judson | |
| 5,778,389 A | 7/1998 | Pruett et al. | |
| 5,892,908 A * | 4/1999 | Hughes et al. | 709/250 |
| 6,012,071 A | 1/2000 | Krishna | |
| 6,061,697 A | 5/2000 | Nakao | |
| 6,078,929 A * | 6/2000 | Rao | 707/200 |
| 6,145,003 A * | 11/2000 | Sanu et al. | 709/225 |
| 6,148,289 A | 11/2000 | Virdy | |
| 6,167,453 A * | 12/2000 | Becker et al. | 709/245 |
| 6,385,606 B2 | 5/2002 | Inohara et al. | |
| 6,393,420 B1 | 5/2002 | Peters | |
| 6,516,337 B1 | 2/2003 | Tripp et al. | |
| 6,519,626 B1 * | 2/2003 | Soderberg et al. | 709/203 |
| 6,626,957 B1 | 9/2003 | Lippert et al. | |
| 6,629,127 B1 | 9/2003 | Deen et al. | |
| 6,823,478 B1 | 11/2004 | Prologo et al. | |
| 6,944,658 B1 | 9/2005 | Schneider | |
| 6,959,288 B1 | 10/2005 | Medina et al. | |
| 6,985,936 B2 | 1/2006 | Agarwalla et al. | |
| 6,990,629 B1 | 1/2006 | Heaney et al. | |
| 7,032,000 B2 | 4/2006 | Tripp | |
| 7,062,506 B2 | 6/2006 | Taylor et al. | |
| 7,086,050 B2 | 8/2006 | Barton et al. | |
| 7,117,504 B2 | 10/2006 | Smith et al. | |
| 7,213,201 B2 | 5/2007 | Brown et al. | |
| 7,263,534 B1 | 8/2007 | Margulis | |
| 7,269,664 B2 | 9/2007 | Hutsch et al. | |
| 7,281,060 B2 | 10/2007 | Hofmann, et al. | |
| 7,287,227 B2 | 10/2007 | Ries et al. | |
| 7,448,032 B2 | 11/2008 | Bourbonnais | |
| 7,457,805 B2 | 11/2008 | Deen, et al. | |
| 7,480,910 B1 | 1/2009 | Kuwamoto et al. | |
| 2001/0002470 A1 | 5/2001 | Inohara et al. | |

(Continued)

OTHER PUBLICATIONS

Berners-Lee et al., "RFC 1738—Uniform Resource Locators (URL)", Dec. 1994.*

(Continued)

*Primary Examiner*—Vivek Srivastava
*Assistant Examiner*—William J Goodchild
(74) *Attorney, Agent, or Firm*—Kilpatrick Stockton LLP

(57) ABSTRACT

A system and method is described for mapping a first uniform resource locator (URL) for a file of a first protocol server to a second URL for the file of a second protocol server comprising capturing entry of the first URL, comparing the first URL to a base URL of the first protocol server, removing a portion of the first URL that does not match the base URL, obtaining a root directory of the file of the second protocol server, adding the portion of the first URL to the root directory to create the second URL.

15 Claims, 2 Drawing Sheets

U.S. PATENT DOCUMENTS

| | | | |
|---|---|---|---|
| 2002/0023112 A1 | 2/2002 | Avital | |
| 2003/0023632 A1* | 1/2003 | Ries et al. | 707/513 |
| 2003/0061278 A1* | 3/2003 | Agarwalla et al. | 709/203 |
| 2003/0167317 A1* | 9/2003 | Deen et al. | 709/219 |
| 2003/0220924 A1* | 11/2003 | Bourbonnais | 707/10 |
| 2004/0177321 A1 | 9/2004 | Brown et al. | |

OTHER PUBLICATIONS

U.S. Appl. No. 10/689,870, J. K. Margulis.
U.S. Appl. No. 10/690,214, M. J. Sundermeyer et al.
U.S. Appl. No. 10/690,980, K. P. Sundermeyer et al.
Office Action dated Nov. 8, 2005 in related U.S. Appl. No. 10/690,980.
Office Action dated Feb. 27, 2006 in related U.S. Appl. No. 10/690,980.
Office Action dated Jul. 27, 2006 in related U.S. Appl. No. 10/690,980.
Office Action dated Dec. 15, 2006 in related U.S. Appl. No. 10/690,980.
Examiner's Answer to Appeal Brief dated Jul. 30, 2007 in related U.S. Appl. No. 10/690,980.
Decision of BPAI dated Jul. 31, 2009 in U.S. Appl. No. 10/690,980.
Office Action dated Oct. 18, 2006 in related U.S. Appl. No. 10/689,870.
Notice of Allowance dated Apr. 23, 2007 in related U.S. Appl. No. 10/689,870.
Office Action dated Mar. 21, 2006 in related U.S. Appl. No. 10/690,214.
Office Action dated Sep. 8, 2006 in related U.S. Appl. No. 10/690,214.
Examiner's Answer to Appeal Brief dated May 31, 2007 in related U.S. Appl. No. 10/690,214.
U.S. Appl. No. 11/019,101, filed Dec. 21, 2004.
Office Action dated Feb. 5, 2009 in related U.S. Appl. No. 11/019,101.
U.S. Appl. No. 11/841,428, filed Aug. 20, 2007.
Office Action dated Jul. 21, 2009 in related U.S. Appl. No. 11/841,428.
Dreamweaver TechNote 16416, "How to make an inherited editable region uneditable," Jul. 6, 2002, p. 1-4.
Fraternali, P., "Tools and Approaches for Developing Data-Intensive Web Applications: A Survey," ACM Computing Surveys, vol. 31, Issue 3, Sep. 1999, p. 227-263.
Altova Inc. & Altova GmbH, "XML Spy 4.0 Manual," copyright 1998-2001, Chapter 3, consisting of pp. 91-286.
GlobalScape, "CuteFTP Pro Technical Overview," White Paper, May 22, 2001, published on the Internet at least by Aug. 14, 2002 from: http://web.archive.org/web/20020814133509/www.globalscape.com/support/manuals.shtml, pp. i-ii and 1-17.
Kim, L., "XML Spy, XML Integrated Development Environments, Accelerating XML Application Development in the Enterprise," Altova Inc. & Altova GmbH 2002, published on the Internet as of Aug. 21, 2002, from link to: http://web.archive.org/web/20020802160016/www.www.xmispy.com/resources_wp.html, pp. 1-20.
GlobalScape, "CuteFTP Pro, User'sGuide," published on the Internet as of Aug. 14, 2002, from link to: http://web.archive.org/web/20020814133509/www.globalscape.com/support/manuals.shtml, downloaded pp. 1-108.
Xiasoft, "Streamlining content creation, retrieval, and publishing on the Web, Using TEXTML Server and XML Spy 4 Suite in an integrated, Web publishing environment," White Paper, Jul. 2002, pp. 1-16.
Office Action dated Oct. 15, 2009 in U.S. Appl. No. 11/019,101.
Office Action dated Dec. 29, 2009 in related U.S. Appl. No. 10/690,214.
Advisory Action dated Dec. 30, 2009 in U.S. Appl. No. 11/019,101.
Office Action dated Jan. 27, 2010 in related U.S. Appl. No. 11/841,428.
Macromedia Dreamweaver MX: Training from the Source, published Jul. 23, 2002, Safari Tech Books Online version, http://proquest.safaribooksonline.com, p. 1-39.

* cited by examiner

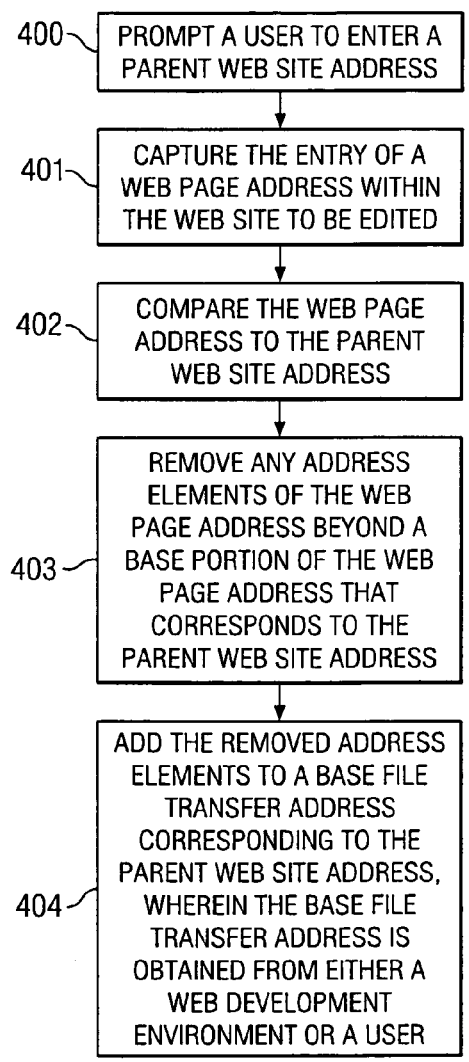

FIG. 3

WEBSITE - http://www.macromedia.com —300
BaseFTP ROOT DIRECTORY - /web_root/mm/ —301
WEB PAGE - http://www.macromedia.com/software/contribute/productinfo/features/01start.html —302
RELATIVE ADDRESS - /software/contribute/productinfo/features/01start.html —303
FTP ADDRESS - ftp://www.macromedia.com/web_root/mm/software/contribute/productinfo/features/01start.html —304

FIG. 4

400 — PROMPT A USER TO ENTER A PARENT WEB SITE ADDRESS

401 — CAPTURE THE ENTRY OF A WEB PAGE ADDRESS WITHIN THE WEB SITE TO BE EDITED

402 — COMPARE THE WEB PAGE ADDRESS TO THE PARENT WEB SITE ADDRESS

403 — REMOVE ANY ADDRESS ELEMENTS OF THE WEB PAGE ADDRESS BEYOND A BASE PORTION OF THE WEB PAGE ADDRESS THAT CORRESPONDS TO THE PARENT WEB SITE ADDRESS

404 — ADD THE REMOVED ADDRESS ELEMENTS TO A BASE FILE TRANSFER ADDRESS CORRESPONDING TO THE PARENT WEB SITE ADDRESS, WHEREIN THE BASE FILE TRANSFER ADDRESS IS OBTAINED FROM EITHER A WEB DEVELOPMENT ENVIRONMENT OR A USER

CROSS-PROTOCOL URL MAPPING

CROSS-REFERENCE TO RELATED APPLICATIONS

The present application is related to concurrently-filed, co-pending, and commonly assigned U.S. patent application Ser. No. 10/690,980, entitled, "CONTENT-RESTRICTED EDITING," U.S. patent application Ser. No. 10/690,214, entitled, "WEB SITE MANAGEMENT LIFECYCLE," and U.S. patent application Ser. No. 10/689,870, entitled, "AUTOMATIC SET UP FOR EDITING A WEB SITE," the disclosures of which are hereby incorporated herein by reference.

TECHNICAL FIELD

The present invention relates, in general, to Uniform Resource Locators (URLs), and, more specifically, to a cross-protocol URL mapping scheme.

BACKGROUND OF THE INVENTION

Companies typically use the World Wide Web to disseminate information both internally, to employees and contractors, and externally, to customers and business partners. This information is usually generated by subject matter experts (SMEs), who are typically people with expertise in the information domain, but who are not usually technically skilled. In order to publish this information to the Web, or edit the existing information already on a company Internet or Intranet Web site, SMEs typically work with technically skilled Web developers, who generally combine Web coding or computer programming skills and graphics design skills. Skilled Web developers are an expensive resource. Moreover, Web developers may divide the coding and graphics arts expertise into multiple people.

Web sites generally comprise a Web server, that serves the visual and data content to the user's browser many times in a format, such as hypertext markup language (HTML), and a file transfer server, that provides read and write-access to the files that make up the visual and data content of the Web sites. While Web servers and file transfer servers are conceptualized as separate and independent machines, Web servers and file transfer servers are typically software applications, often times running on the same computer. The underlying Web files are usually stored on the computer, and the Web server and file transfer server interact with those files in different ways. Web servers typically allow read-only access to the files through HTML browsers, compared to the read/write-access allowed by the file transfer servers. Because the file transfer server allows read/write-access to Web files, general users are not typically given access to the file transfer server because changing files through the file transfer server will usually change how the Web pages are served through the Web server to the accessing browsers. Instead, file transfer server access is generally limited to Web developers or those who have some authority over the Web content. The file transfer server is typically run using a specific transfer protocol, such as file transfer protocol (FTP), secure FTP (SFTP), or the like. Additionally, the file transfer server may be set up on a local area network (LAN) or the like. While the Web server delivers HTML content, it uses hypertext transfer protocol (HTTP) to transfer the requests and the resulting HTML content between the user's browser and the Web server. Even though both FTP and HTTP are transfer protocols, they are designed for different purposes and are not necessarily compatible.

For example, the file management system for HTTP will generally be different than that of FTP. HTTP is designed for more open access than FTP. HTTP communications revolve around establishing communication between a browser and a Web server in which HTML documents and any supporting documents that correspond to an HTTP request are transmitted from the Web server (sometimes called an HTTP server) to the browser to be rendered to the user. An example HTTP request is: http://www.macromedia.com/index.html. The example request would likely be entered by a user into a Web browser. The http:// indicates the request is an HTTP request. The www.macromedia.com indicates the specific Web server domain to which the request is directed. Index.html is the specific file requested for display.

In contrast, FTP includes functions for logging onto the network, listing directories, copying files, and the like. An example FTP command is: ftp://ftp.macromedia.com. When entered in a browser, the ftp:// indicates that the request is an FTP request. The ftp.macromedia.com is the name of the domain that the user wishes to log onto. Login and password information would still generally be required for the user to actually log on to the ftp.macromedia.com FTP server. Once logged on, the user can download and store files, see directories of the files on the FTP server and the like, depending, in general, on the level of authorization the particular user has for that particular FTP server. However, if the user were looking for the index.html file from the HTTP example, it would likely not be found if the user attempted to access www.macromedia.com/index.html. The user would need to obtain the FTP path that corresponds to that particular Web site.

General users are not typically given access to the file transfer server for any particular Web site because manipulating files in the file transfer server will usually change how the Web pages are seen or not seen by the accessing browsers. File transfer server access is generally limited to Web developers or those who have some authority over the Web content. Web development environments and development tools exist to assist the developers both retrieve and edit the underlying files that make up the Web pages. In order to access the FTP server, a Web designer or developer is generally prompted by the server access application to provide the FTP host name, the FTP login, the FTP password, and the FTP path. While the FTP host name, login, and password are usually the pieces of information that will get the user onto the FTP server, without the FTP root path name, a user will not likely find the location on the FTP server where the underlying Web files are located. For most experienced designers or developers all of this information is relatively easy to know and/or obtain. A novice or non-technical user may know the FTP host name, login, and password, but would generally not know the FTP root path; and, without the root path, the FTP server will generally not allow access to the appropriate file locations. One solution for such novice or non-technical persons is to track down an information technology (IT) professional or other computer professional to obtain that information. Another solution is to simply hire an experienced designer to make the desired changes to the Web site. However, each of these current solutions comes at a cost of considerable time and money; sometimes just to make a few minor changes or revisions to the Web site.

BRIEF SUMMARY OF THE INVENTION

The present invention is directed to a system and method for converting the URL for a file stored in a first protocol server to a URL of that file stored in a second protocol server.

A first embodiment of the present invention allows mapping of a URL for a Web file stored according to an HTTP server file system to the URL of that file as it is stored according to a file transfer server file system, such as an FTP server. This process is useful in maintain and editing Web sites, and thus may be included as a feature in a Web development environment. The process begins with two pieces of information: the base URL of the underlying Web site; and the base root directory name of that Web site on the FTP server. Both the base URL and the base root directory name may be obtained by a user, but preferred embodiments of the present invention may obtain the base URL from a user and the base root directory name automatically from a Web development environment.

As the user of the Web development environment enters the specific URL of the Web page desired to be edited, the mapping method compares the base Web site URL to the exact URL of the Web page. Any address elements that extend beyond that of the base Web site URL are stripped off as the relative address of that Web file. The address is then mapped into the file transfer URL by adding the relative address to the FTP base root directory associated with the Web site. The new address is the complete file transfer URL for the Web page file to be edited. The Web development environment may then use that file transfer URL to retrieve the appropriate file from the FTP server. Thus, the file transfer URL is determined automatically, without the user needing to have that specific information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 is a table illustrating the various address segments used in an embodiment of the present invention; and FIG. 4 is a flowchart illustrating steps taken in implementing one embodiment of the present invention.

DETAILED DESCRIPTION OF THE INVENTION

Web site maintenance is typically a time consuming and costly process. Even where small changes to the content of Web pages are made, development professionals typically are required to implement the changes due to their specific knowledge of the Web server/FTP server systems and, in the interest of preserving the format and design of the Web sites that they have spent considerable effort designing and implementing. A new technology developed by MACROMEDIA, INC., and described in concurrently-filed, commonly-owned patent application Ser. No. 10/690,214, entitled, "WEB SITE MANAGEMENT LIFECYCLE," allows non-technical users to browse to a particular Web site or Web page in which the content is to be edited/deleted/added, click on a button to edit that Web page, after which the system seamlessly presents the editable file in the same visual window to the user who may then edit the Web file in the same screen, and then click on a publish button, after which the system seamlessly stores the underlying, now-edited, Web file back onto the computer or storage devices holding the Web files along with the necessary dependent files in the appropriate places according to the filing system of the FTP server. This process generally occurs without the necessity that the user know the correct FTP server file transfer root directory name or the relationship between the Web server and the FTP server file systems.

One problem in implementing this Web site management lifecycle is the mapping of the uniform resource locators (URLs) between the Web transfer protocol, such as HTTP, and the transfer protocol, such as FTP. Providing the ability to present the editable Web file, from the FTP server, to the user having only the Web page URL, creates a mapping problem that is addressed by the present invention.

Figure 1:
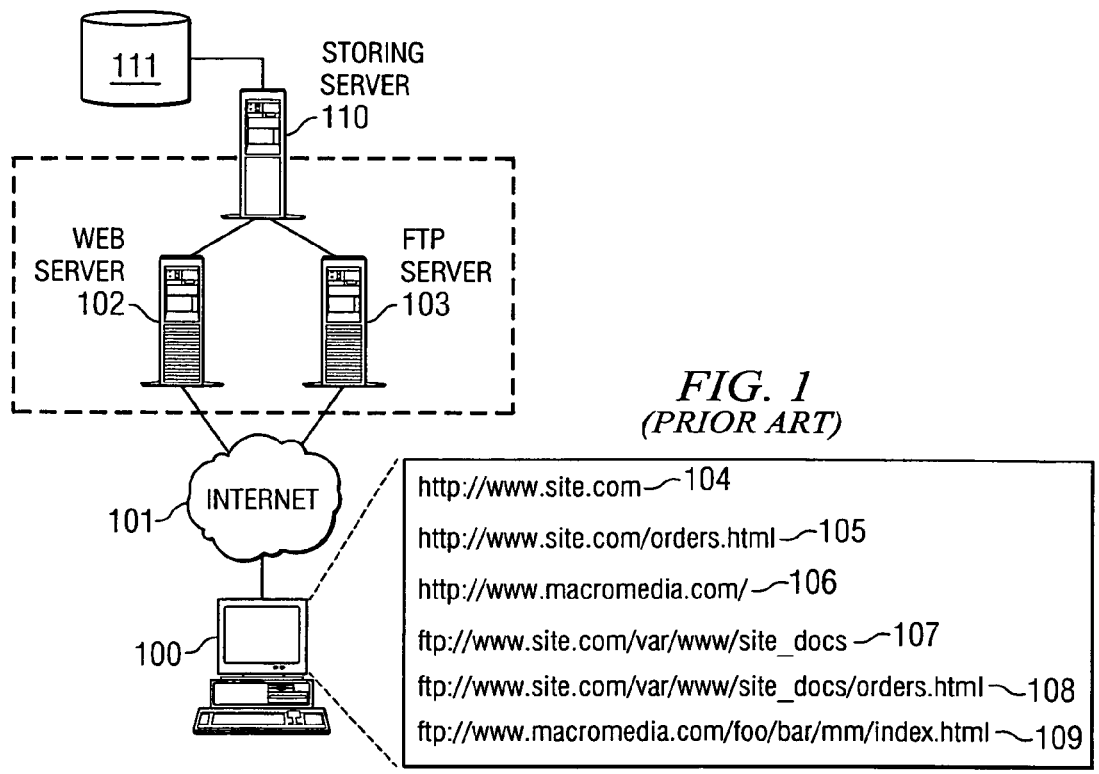
FIG. 1 is a block diagram illustrating a typical Internet interaction.

FIG. 1 is a block diagram illustrating a typical Internet interaction. Computer 100 maintains a connection to Internet 101. When the user at computer 100 desires to view a Web site, he or she types in a Web address, which is an HTTP formatted request, such as http://www.site.com 104. The browser connects to Web server 102 through Internet 101. Using the HTTP formatted request, Web server accesses the www.site.com domain and sends the HTML for the Web page to be displayed, along with the dependent file assets, back to the browser at computer 100. The Web files underlying the HTML and the dependent file assets are typically stored on a central storing computer or may be stored on some kind of storage device accessible by a computer server. Web server 102 and FTP server 103, which are typically software applications may actually run from this same central computer. Each of Web server 102 and FTP server 103 have file systems that point to the underlying Web files being held at the storing computer or storage device. However, each may have a different addressing system to map to those same underlying files.

HTTP formatted requests may request a specific file, such as in http://www.site.com/orders.html 105, which specifically requests the orders.html file from Web server 102, or may request a directory, such as in http://www.macromedia.com/106. When a directory is requested, Web server 102 typically attempts to retrieve the index page for that directory. In many implementations, the index page for a Web site is that site's home or main page. Thus, on the request of 106, Web server 102 would likely retrieve the main/index page at macromedia.com.

The mapped addresses of each of the files requested from the HTTP formatted requests may be quite different for FTP server 103. For example, request 104 may translate to an FTP path of ftp://www.site.com/var/www/site docs/107. Therefore, request 105 for the orders.html file may then translate to an FTP path of ftp://www.site.com/var/wwvv/site docs/orders.html 108. Similarly, directory request 106 may translate into an FTP path of ftp://www.macromedia.com/foo/bar/mm/index.html 109. In order to create a more efficient management process, many developers try to follow some kind of regular addressing scheme for Web server 102 and FTP server 103. If they were to use an elaborate naming convention, it would likely be very difficult to perform maintenance on the Web site.

Figure 2:
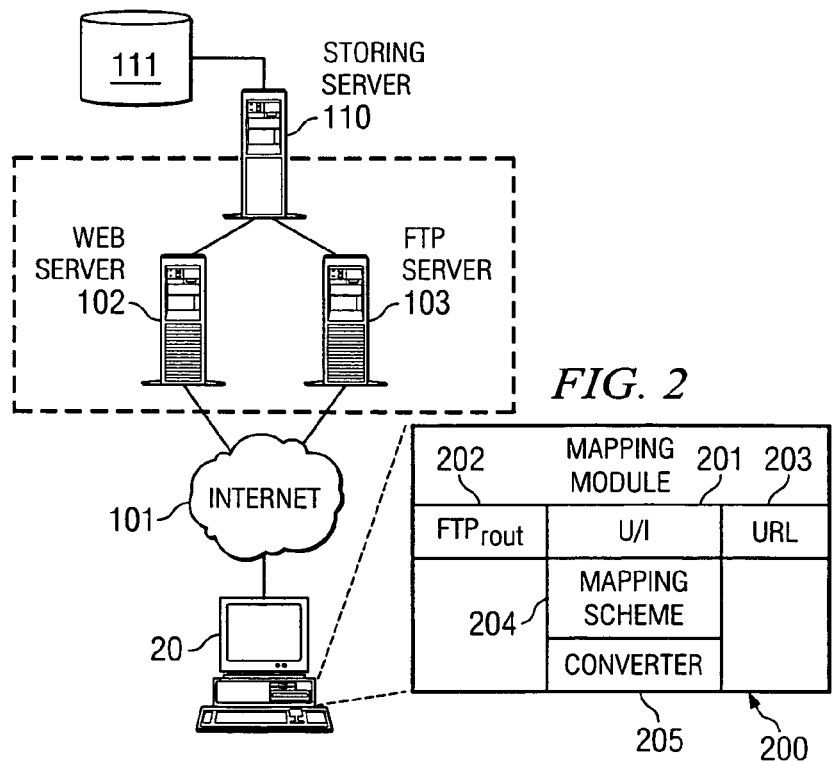
FIG. 2 is a block diagram illustrating a computer running a Web development environment configured according to the teachings of one embodiment of the present invention.

FIG. 2 is a block diagram illustrating computer 20 running a Web development environment configured according to the teachings of one embodiment of the present invention. The Web development environment includes mapping module 200 for automatically facilitating file mapping between the protocols of Web server 102 and FTP server 103. In the example embodiment illustrated in FIG. 2, Web server 102 may operate HTTP, while FTP server 103 may operate FTP. User interface module 201 of mapping module 200 allows interaction with the user/developer. When initiating the Web development environment, a user may provide several pieces of information regarding the Web site that he or she is interested in editing. The user may provide information such as the base Web site address, the FTP host name, the login information, including the password, and other such information that would be readily accessible to a non-technical user. The base Web site address is stored into URL 203 of mapping module 200. The second piece of information that mapping module 200 obtains is the base FTP root directory.

The base FTP root directory may either be provided by the user or may be provided automatically by the Web development environment. Because the base FTP root directory name is information that is not typically easily available to non-technical individuals, an automatic method for obtaining it is beneficial. A new technology developed by MACROMEDIA, INC., and described in concurrently-filed, commonly-owned patent application Ser. No. 10/311,290, entitled, "AUTOMATIC SET UP FOR EDITING A WEB SITE," provides an automated process for finding the base root directory in the FTP server that represents that Web site. Therefore, the mapping module 200 may obtain the base root directory in the FTP server through operation of the automatic set up technology described in the above-styled commonly-owned patent application. Once the base FTP root directory is obtained, mapping module 200 places it in FTP root 202.

In operation, as a user on computer 20 enters a particular Web page to edit, mapping scheme module 204 compares the address of the Web page to the base Web site address in URL 203. A relative page address is thereafter obtained by stripping off the portion of the Web page address beyond the base Web site address in URL 203. Converter module 205 creates the direct file transfer path by adding the relative page address obtained by mapping scheme module 204 to FTP root 202. Thus, the development environment running on computer 20 may thereafter access FTP server 103 directly through Internet 101 to obtain the target file asset using the file transfer path created by converter module 205.

FIG. 3 is a table illustrating examples of address segment types that may be used in an embodiment of the present invention. The base Web site address is shown as http://www.macromedia.com 300. This HTTP formatted request/address designates the appropriate Web server domain, www.macromedia.com. The base FTP root directory is shown as /web_root/mm/301. The development environment configured according to an embodiment of the present invention uses these two items of information to perform the mapping between HTTP and FTP. A specific Web page may be addressed by http://www.macromedia.com/software/contribute/productinfo/features/01start.html 302. The domain portion of this Web address/HTTP request is www.macromedia.com 300. Everything after the domain is considered the relative address of the requested Web file, 01start.html. Therefore, the relative address in FIG. 3 would be /software/contribute/productinfo/features/01 start.html 303. If the user browsed to Web page 302 and clicked on the edit button of the Web development environment configured according to not only an embodiment of the present invention but also an embodiment of the concurrently-filed, commonly-owned patent application Ser. No. 10/690,214, entitled, "WEB SITE MANAGEMENT LIFECYCLE," the mapping scheme of the present invention would add relative address 303, to base FTP root directory 301 to form the FTIP address, ftp://www.macromedia.com/web_root/mm/software/contribute/productinfo/features/01start.html 304. Using FTIP address 304, the development environment would retrieve the underlying Web file, 01start.html from the FTP server and deliver it to the development environment running on the developer's computer to be edited. Thus, because the user does not have to know, in advance, what the FTP file transfer path address of each individual Web file desired to be edited, the user does not need to have much computer training to implement any desired changes to the Web file.

FIG. 4 is a flowchart illustrating steps taken in implementing one embodiment of the present invention. In step 400, a user is prompted to enter a parent Web site address. This may happen when the user first initializes his Web development software, or on an ad hoc basis when he or she wishes to edit different Web sites. In step 401, when a user desires to edit a particular page, the entry of the specific Web page address within the Web site to be edited is captured. The Web page address is then compared to the parent Web site address in step 402. In step 403, any address elements of the Web page address beyond a base portion of the Web page address that corresponds to the parent Web site address are removed. The removed address elements are then added in step 404 to a base file transfer address corresponding to the parent Web site address, wherein the base file transfer address is obtained from either a Web development environment or a user.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
   capturing entry of a first uniform resource locator (URL) for a file of a first protocol server;

comparing said first URL to a base URL of said first protocol server;
when a base portion of the first URL matches the base URL of the first protocol server, removing a portion of said first URL that does not match said base URL of the first protocol server;
obtaining a root directory of said file of a second protocol server;
adding said portion of said first URL to said root directory to create a second URL; and
retrieving said file using said second URL and providing said retrieved file to a web development environment for editing, wherein said web development environment provides a user interface that enables editing of a file.

2. The method of claim 1 further comprising:
requesting a user for entry of said base URL of said first protocol server.

3. The method of claim 1 wherein said root directory is obtained from a user.

4. The method of claim 1 wherein said root directory is obtained automatically from the development environment.

5. The method of claim 1 wherein said first protocol server and said second protocol server are located on a same physical computer system.

6. The method of claim 1 further comprising:
receiving via said user interface of said web development environment, user input editing the retrieved file.

7. A computer system configured to:
acquire entry of a first URL for a file on a first protocol server;
compare said first URL to a base URL of said first protocol server;
remove a non-matching part of said first URL responsive to said code for comparing when the first URL matches the base URL;
acquire a root directory for said file on a second protocol server;
concatenate said non-matching part of said first URL to said root directory to create a second URL of said second protocol server; and
retrieve the file using the second URL and provide the file to the web development environment, said web development environment providing a user interface that enables editing of the file.

8. The computer system of claim 7 further configured to:
prompt a user to enter said base URL of said first protocol server.

9. The computer system of claim 7 wherein said root directory is obtained from a user.

10. The computer system of claim 7 wherein said root directory is automatically obtained from a development application.

11. The computer system of claim 7 wherein said first protocol server and said second protocol server are run from a single physical computer system.

12. A method in a web page authoring environment for automatically converting Web addresses into file transfer addresses comprising:
capturing entry of a Web page address;
removing address elements of said Web page address beyond a base portion of said Web page address corresponding to a parent Web site address when the base portion of the Web page address is found in a mapping database;
adding said removed address elements to a base file transfer address corresponding to said parent Web site address to create a second URL; and
retrieving a file using the second URL and providing the file to the web page authoring environment for editing.

13. The method of claim 12 further comprising:
prompting a user to enter said parent Web site address.

14. The method of claim 12 further comprising:
comparing said Web page address to said parent Web site address prior to said removing.

15. The method of claim 12 further comprising:
obtaining said base file transfer address from one of:
the Web page authoring environment; and
a user.

* * * * *